US010074105B2

(12) United States Patent
Vaysman

(10) Patent No.: US 10,074,105 B2
(45) Date of Patent: Sep. 11, 2018

(54) TECHNIQUE FOR ENCODING DIGITAL INFORMATION IN A CARRIER WAVE

(71) Applicant: Aintu Inc., San Jose, CA (US)

(72) Inventor: Arthur Vaysman, San Jose, CA (US)

(73) Assignee: Aintu Inc., Sunnyvale, CA (US)

( * ) Notice: Subject to any disclaimer, the term of this patent is extended or adjusted under 35 U.S.C. 154(b) by 0 days.

(21) Appl. No.: 14/714,127

(22) Filed: May 15, 2015

(65) Prior Publication Data

US 2015/0332324 A1 Nov. 19, 2015

Related U.S. Application Data

(60) Provisional application No. 61/993,965, filed on May 15, 2014.

(51) Int. Cl.
*G06Q 30/00* (2012.01)
*G06Q 30/02* (2012.01)
*G06Q 20/32* (2012.01)
*G06Q 20/38* (2012.01)

(52) U.S. Cl.
CPC ....... *G06Q 30/0257* (2013.01); *G06Q 20/327* (2013.01); *G06Q 20/387* (2013.01); *G06Q 30/0207* (2013.01)

(58) Field of Classification Search
CPC .... G06Q 30/00; G06Q 30/02; G06Q 30/0207; G06Q 30/0241
USPC ................ 705/44; 340/5.2; 725/34; 330/302
See application file for complete search history.

(56) References Cited

U.S. PATENT DOCUMENTS

2002/0105384 A1* 8/2002 Dent ....................... H01P 1/212
330/302
2010/0325660 A1* 12/2010 Holden ............... G11B 27/005
725/34

* cited by examiner

*Primary Examiner* — Marilyn G Macasiano
(74) *Attorney, Agent, or Firm* — HM Law Group LLP; Vani Moodley, Esq.

(57) ABSTRACT

A method for redeeming a coupon using a mobile device is disclosed. The method comprises allowing a user to select the coupon; accessing at least one melody stored in a memory of the mobile device; passing a coupon identifier for the coupon and the at least one melody to an encoder component of the mobile device encoding the coupon identifier and the melody by the encoder component to generate a signal for transmission; and transmitting said signal through a speaker of said mobile device for reception through a microphone of a receiving mobile device.

14 Claims, 16 Drawing Sheets

TECHNIQUE FOR ENCODING DIGITAL INFORMATION IN A CARRIER WAVE

This application claims that the benefit of priority to prior U.S. provisional patent application No. 61/993,965 entitled "TECHNIQUE FOR ENCODING DIGITAL INFORMATION IN A CARRIER WAVE", filed May 15, 2014.

BACKGROUND

Embodiments of the invention relate to techniques for encoding digital information in a carrier wave.

Coupons are routinely published by merchants/vendors in order to improve sales. Historically, coupons existed in printed form. However, increasingly coupons now exist in digital form wherein they may be viewed on display screen of a device such as a tablet computer.

SUMMARY

In one aspect of the invention, a novel encoding scheme for transmitting digital data over a short-range audio link is disclosed. Advantageously, for the transmission commodity microphone and speaker hardware associated with a handheld mobile device may be used. Moreover, even under noisy conditions the digital data may transmitted and decoded.

In another aspect of the invention, the encoding scheme may be designed to spread signal energy over a wide frequency range to provide immunity against frequency-dependent channel fades. Simultaneously, the scheme may allow for complexity detection of incoming transmissions, as well as precise synchronization to the digital data stream encoded in the transmission.

In another aspect of the invention, the encoding scheme may be designed to make maximum use of the limited dynamic range of the transmit speaker hardware by using square wave rather than sinusoidal signals.

As implemented, the invention may have the usual elements of any communication system including a source encoder or compression engine, an error correction code, a checksum sequence, digital to analog converter and transducer hardware to create sound waves from a voltage waveform on the transmitter side, and a sensor e.g. a microphone to detect air pressure variations from sound waves, an analog to digital converter, logic to detect and decode incoming data transmissions and to check the integrity of the transmission using the checksum.

The transmitted waveform may comprise a concatenation of two or more of the following distinct signals: a "start melody", "detection beacon", "preamble", "silence gaps", "data" and "end melody".

Each of these signals are intended to serve one distinct purpose: e.g. the start and end "melodies" are designed to bookend the rest of the transmission to make the overall audio pleasing or at least comfortable to the human ear. It may also have the effect of masking the transmission to potential eavesdropping devices.

In another aspect of the invention, two or more separate signals may be generated to aid detection and synchronization. In conventional communications systems, a preamble sequence which has sharply peaked autocorrelation properties is used to accurately identify the start of incoming transmissions. However, detecting such a sequence requires the use of a linear filter matched to the preamble sequence which usually takes the form of an FIR filter with a long impulse response. This can be an expensive operation in terms of power, CPU and memory especially for receivers that need to continuously monitor for incoming transmissions. A device using the inventive encoding scheme may employ an additional signal that is easy to detect, but does not have a sharp correlation function to first detect a transmission and only then invoke the expensive filter that searches for the preamble.

The waveform used to modulate data may have a constant envelope or at least a small peak to average ratio (e.g. the peak to average power ratio may be 0.5). One example of such a signal is a "square chirp (SC)"; just like the common chirp signal, the SC is a quasi-periodic signal with a frequency that increases at a constant rate in time over a specified band. However, unlike the common (sinusoidal) chirp, the SC consists of square waves, which surprisingly makes better use of the peak transmit power capability of the speaker hardware. The use of square wave signals in SC does lead to higher frequency harmonics, but under peak power rather than battery constraints, thus the waste of power represented by these harmonics is irrelevant. In one embodiment, interference with other devices is not an important consideration because of the short range and short duration of the transmission.

Other aspects of the invention will be apparent from the detailed description below.

DETAILED DESCRIPTION OF SOME EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the invention disclose an encoding scheme for transmitting digital data over a short-range audio link. Advantageously, for the transmission commodity microphone and speaker hardware associated with a handheld mobile device may be used. Moreover, even under noisy conditions the digital data may transmitted and decoded.

The encoding scheme may be used to facilitate the redemption or exchange of coupons in digital form, as will be described later.

Figure 14:
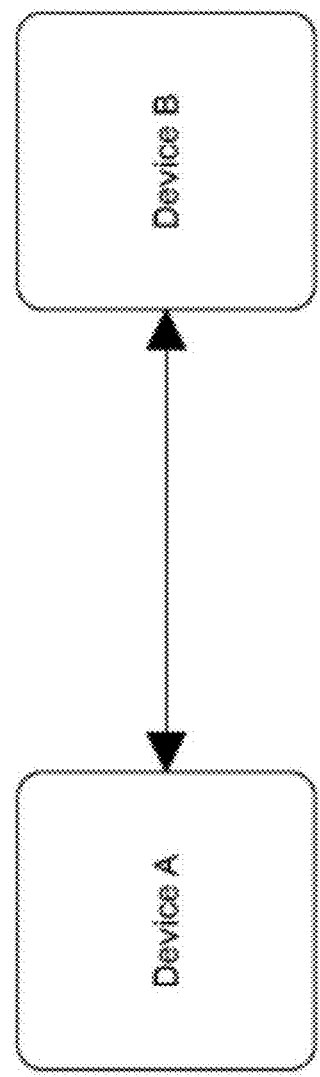
FIG. 14 shows a transmitting device A and receiving device B configured to perform the encoding scheme of the present invention.

Referring to FIG. 14 of the drawings, there is shown a transmitting device A, and receiving device B. The device A may be a mobile phone, tablet computer, or any other like consumer device which includes a display screen by which a coupon may be viewed. The device B may be similar to the device A in functionality, and may represent a device under control of a merchant.

In one use case, a coupon loaded into a memory associated with the device A is to be redeemed by transmission of said coupon from the device A to the device B, as will be described.

In one embodiment, a code representing the coupon on the device A may be encoded for transmission by a carrier wave using a frequency modulation scheme such as Frequency-Shift Keying (FSK). Thus, the coupon may be transmitted using discreet frequency changes of a carrier wave that is broadcast from the device A to device B.

Figure 15:
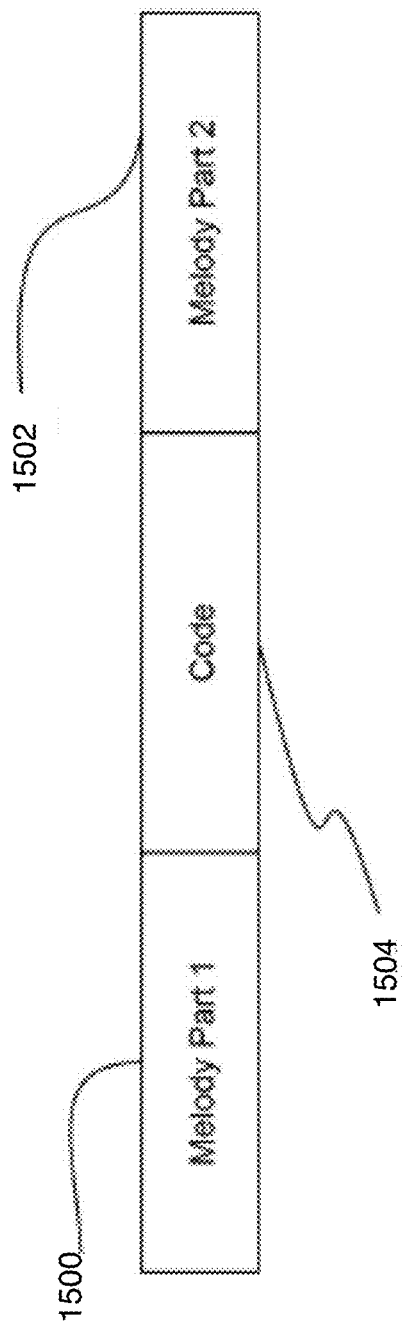
FIG. 15 shows a code 14, representing a coupon sandwiched between a first part 10 of a melody and a second part 12 of said melody, in accordance with one embodiment of the invention.

Unfortunately, said discreet frequency changes when heard by the human ear can be very unpleasant. Accordingly, in one embodiment, the code representing the coupon is sandwiched between two portions of the melody/tune, which are also encoded through frequency modulation for transmission by the carrier wave. This is shown in FIG. 15 of the drawings, where a code 1504, representing the coupon is sandwiched between a first part 1500 of a melody and a second part 1502 of said melody.

Figure 16:
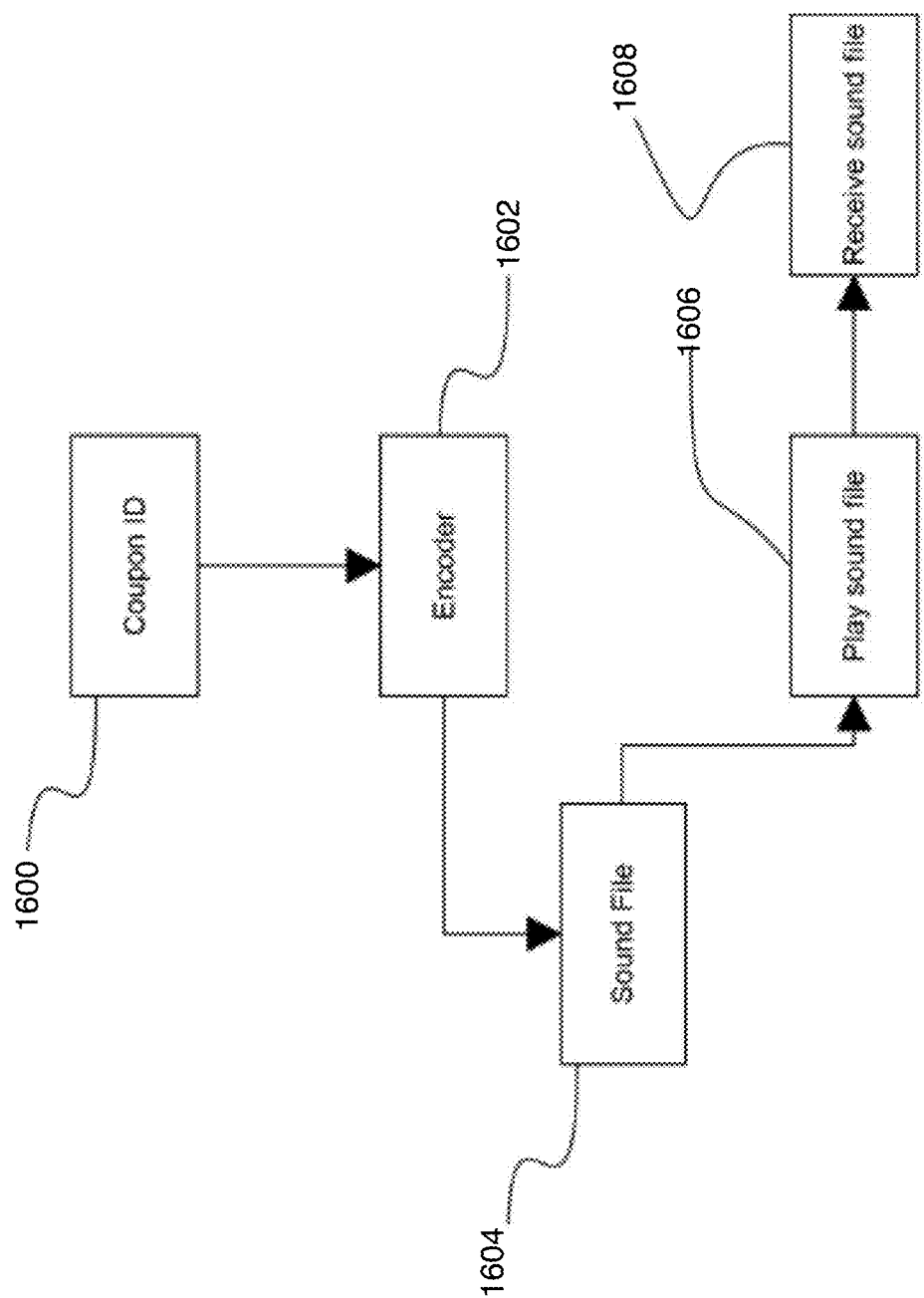
FIG. 16 of the drawings illustrates how a coupon code may be encoded into a signal using the encoding scheme of the present invention.

Referring now the FIG. 16 of the drawings, in one embodiment, in order to generate a signal with a coupon code sandwiched between two parts of the melody, a coupon 1600 is input into an encoder 1602. The encoder 1602 is configured to implement encoding techniques, such as the FSK encoding technique described above. The encoder 1602 encodes the coupon 1600 together with a melody or tune to produce a sound file 1604 which includes two melody portions and a code representing the coupon 1600 sandwiched therebetween in similar fashion to what has been described above with reference to FIG. 15. The encoding and the generation of the sound file 1604 is performed by the device A.

In one embodiment, for exchange or redemption of coupon, the device A plays the sound file 1604 at block 1606. The sound file 1604 is received by the device B at block 24 through a microphone associated with the device B. Within the device B, once the code portion 1504 of the sound file 1604 has been received, decoding thereof begins. This process happens concurrently as the melody portions 1500/1502 are played. In one embodiment, the melody portions 1500/1502 may be of a sufficient length to enable the device B to completely decode the portion 1504 so that when the melody portions 1500/1502 end, the code 1504 is completely decoded. Thus, a perception of a fast decode is achieved. Moreover, playing of the melody portions masks the unpleasant sound associated to the code 1504.

Figure 1:
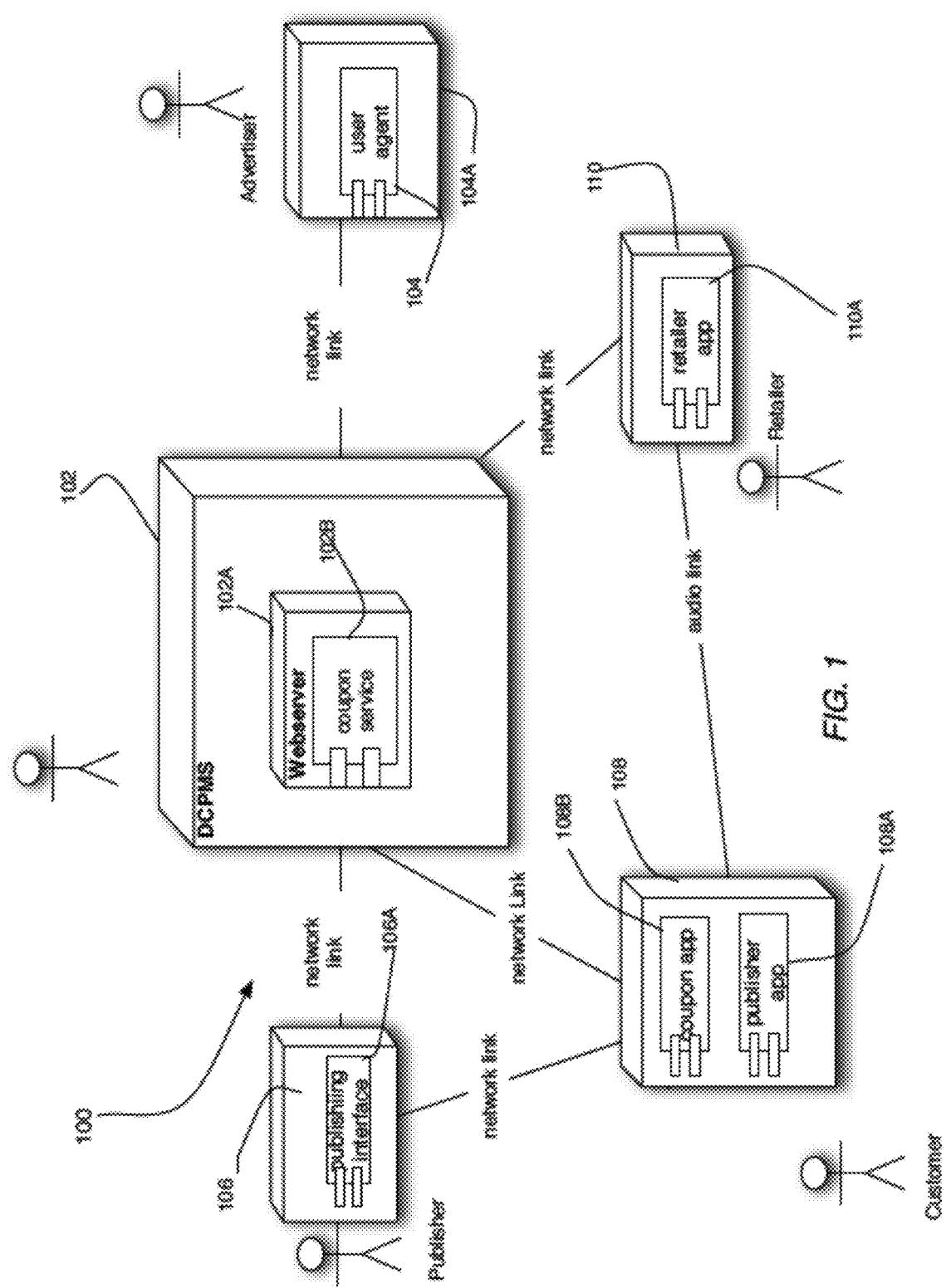
FIG. 1 shows a deployment drawing, in accordance with one embodiment of the invention

FIG. 1 shows a deployment scenario 100 for a coupon service, in accordance with one embodiment of the invention. Referring to FIG. 1 a Digital Coupon Personalization and Management System (DCPMS) 102 includes a server component 102A which implements a Coupon Service (CS) 102B. The CS 102B is under control of a Coupon Service Provider (CSP) A plurality of advertiser nodes 104 each equipped with an appropriate user agent (browser) 104A are communicatively coupled to the DCPMS 102 by means of a network link 112. In one embodiment, each advertiser node 104 may include a computing device such as a laptop or PC, and the network link 112 may comprise the Internet. Each advertiser node 104 represent an Advertiser who uses the CS to generate coupons on its behalf, as will be explained.

The DCPMS 102 may also be communicatively coupled with plurality of publisher nodes 106 by means of a network link 112. Each publisher node 106 represent a computing device such as a PC and includes a publishing interface 106A, which represent the mechanism whereby a Publisher is able to publish media on a customer node 108 for viewing by a Customer. Examples of Publishers includes CNN, Facebook, YouTube, etc.

The customer node 108 represents a customer device such as smartphone or tablet PC. In one embodiment, the customer node 108 may include a publisher app 108A and a coupon app 108B. The publisher app 108A may be configured to receive media content from a Publisher, as will be described more fully later. The media content may include a personalized coupon generated by the DCPMS 102.

Finally, the deployment scenario 100 also includes a retailer node 110 which represents retailer. In one embodiment, the customer node 108 communicates with the retailer node 110 via an audio link 114.

Figure 2:
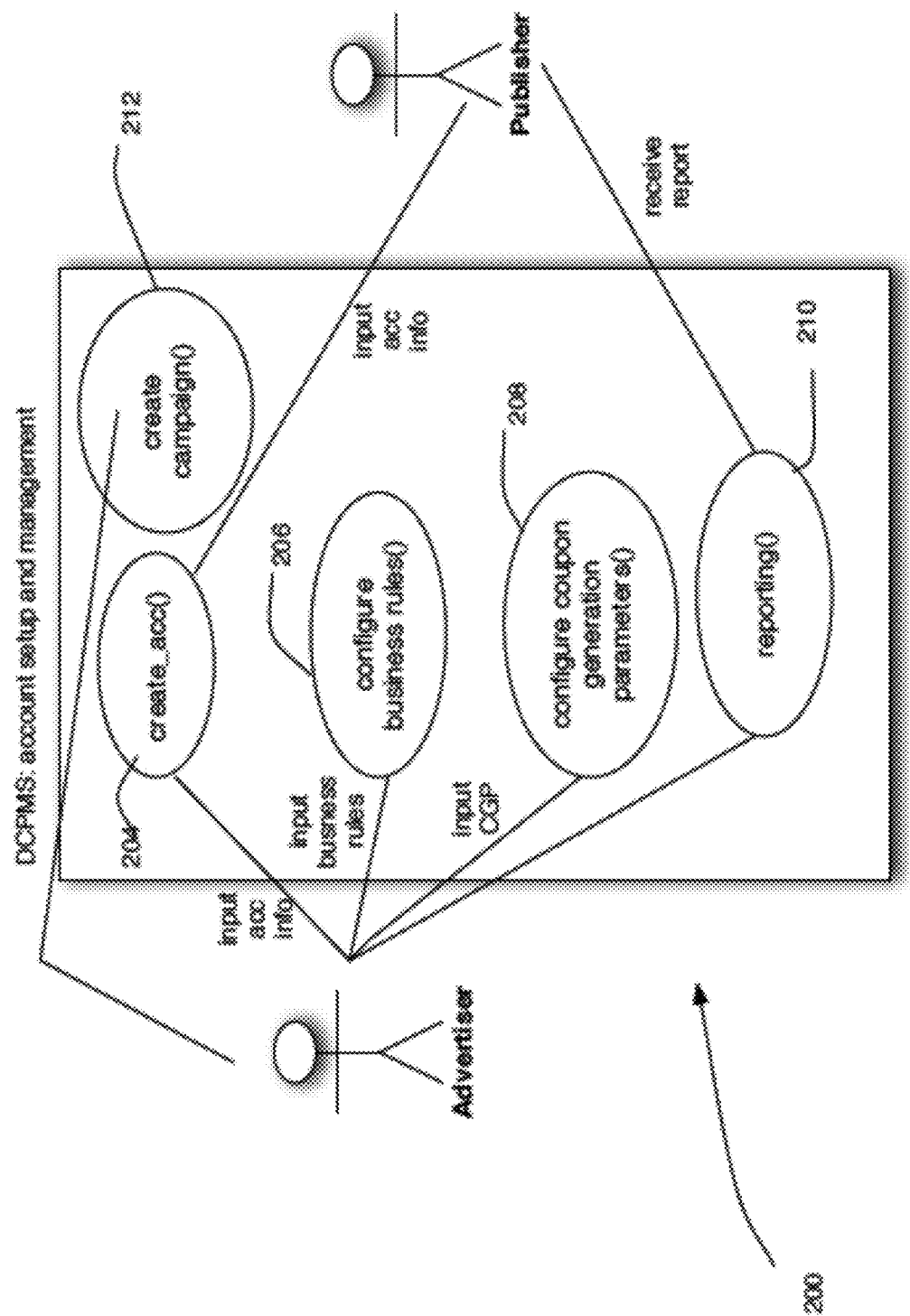
FIG. 2 shows the use cases for the DCPMS, in accordance with one embodiment of the invention.

FIG. 2 shows use cases 200 for the DCPMS 102, in accordance with one embodiment of the invention. As will be seen, the DCPMS 102 supports a create_account( ) function 202 which allows an Advertiser and a Publisher to create user accounts on the DCPMS 102. A configure_business_rules( ) function 208 allows an Advertiser to provision business rules and objectives in the DCPMS 102. The business rules and objectives may be used to generate highly personalized coupons for publishing to particular customers, as will be described. The use cases 200 also includes a configure_coupon_generation_parameters( ) process 210 whereby an advertiser configures coupon generation parameters which are used to generate personalized coupons. Examples of coupon generation parameters include the following:

(a) Demographic data;
(b) Geographic data;
(c) Offer size for a coupon offer. This may be specified in the terms of a minimum offer size and a maximum offer size;
(d) The particular medium for which a coupon needs to be generated. Examples of media include video content, banner ads, and printed ads.
(e) Publisher. Examples of publishers includes Facebook, YouTube, CNN etc.;
(f) Context for the coupon. Examples of contexts includes sports, politics, science, business, lifestyle, etc.;
(g) Psycho-graphic information comprising values, opinions, attributes, interests, and lifestyles associated with a target demographic group.

Finally, the use cases 200 include a reporting function 212 whereby reports are generated for Advertisers and Publishers.

Figure 3:
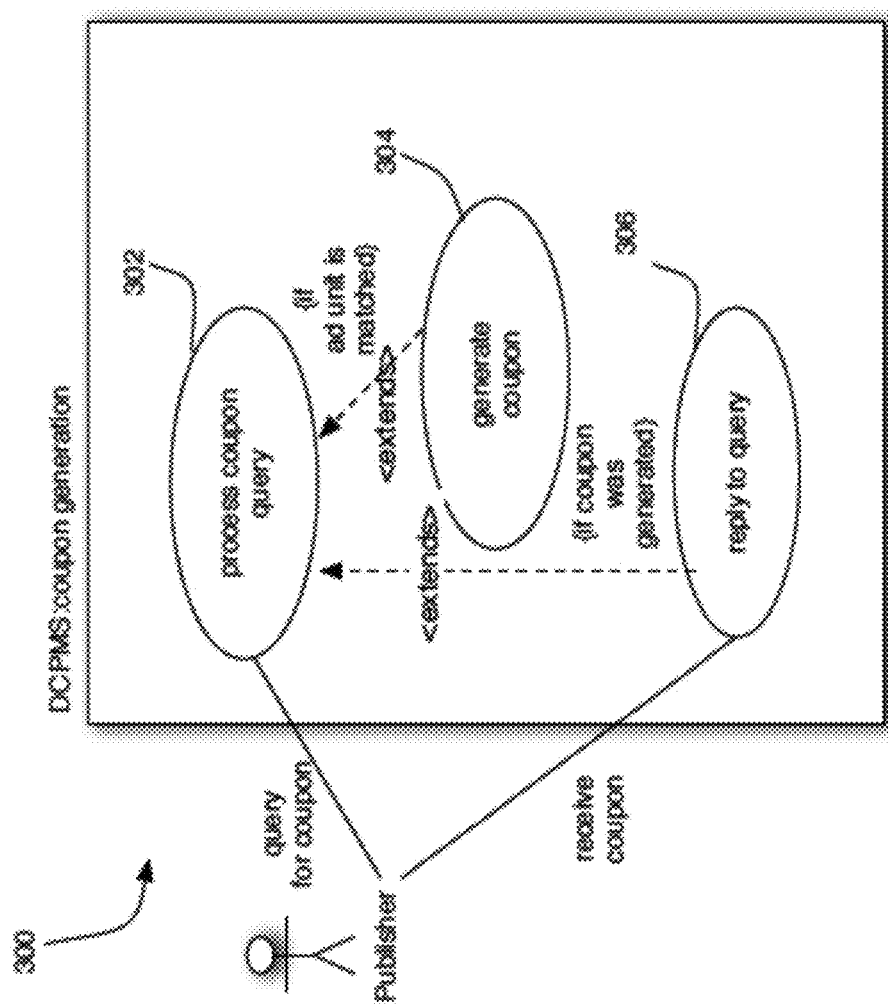
FIG. 3 shows the use cases for coupon generation, in accordance with one embodiment of the invention.
Figure 5:
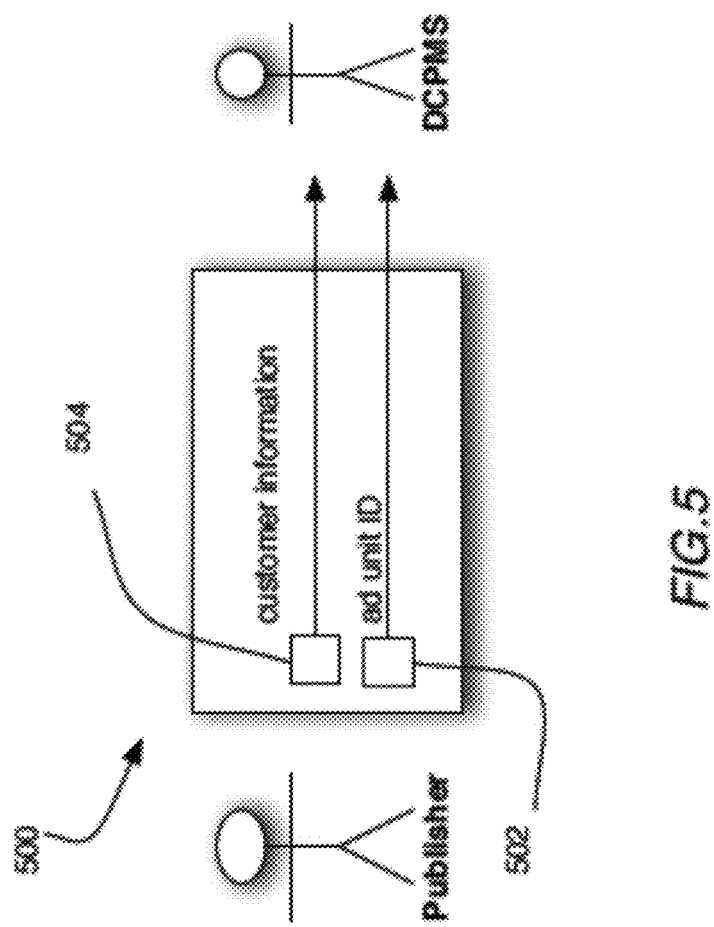
FIG. 5 shows a coupon query Q1, in accordance with one embodiment of the invention.
Figure 7A:
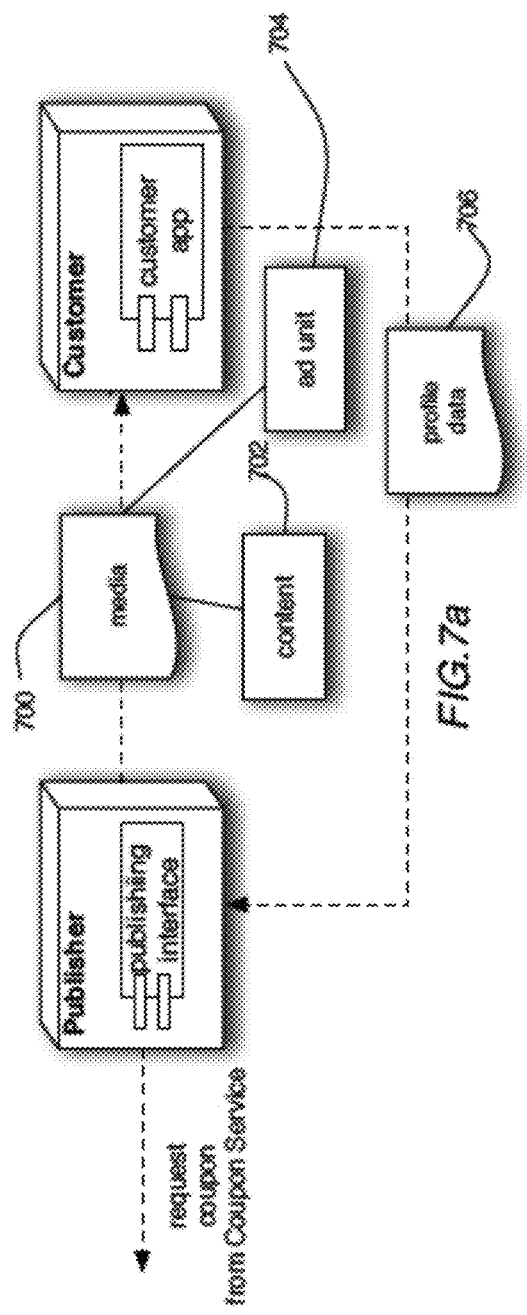
FIGS. 7*a-b* shows a Publisher publishing media on a Customer node, in accordance with one embodiment of the invention.

Referring now to FIG. 3 of the drawings, there is shown use cases 300 for coupon generation, in accordance with one embodiment of the invention. In terms of the use cases 300, a Publisher sends a query Q1 to the DCPMS 102. The query Q1 is a request for a coupon. Generally, at the time of sending the query Q1, the Publisher is already publishing content to a customer and is the further, typically displaying an advertisement unit (ad unit) in association with the content. This can be seen in FIG. 7a, which shows media 700 being published on a customer node 108, wherein the media 700 includes content 702 and an ad unit 704. FIG. 5 shows the elements of the query Q1, in one embodiment. As will be seen, Q1 includes customer information 500 and an ad unit id 502. The ad unit id 502 corresponds to the ad unit being shown to the Customer. The customer information corresponds to profile information/data 706 (see FIG. 8) about the Customer. The profile data 706 is collected from the Customer node 108 by the Publisher and includes that customer's browsing behavior and information about the customer device itself.

Responsive to receiving the coupon query Q1, the DCPMS 102 executes a process coupon query block 304. Under this block, the DCPMS 102 attempts to match the ad unit id in the coupon query Q1 in an ad unit list. The ad unit list is provisioned by an Advertiser and is basically a listing of ad units for which coupons must be generated by DCPMS 102. Thus, under the process 304, if the ad unit id is matched then a generate coupon function 306 is executed. Under this process, a personalized coupon is generated based on the coupon configuration parameters and based on machine learning techniques.

Figure 7B:
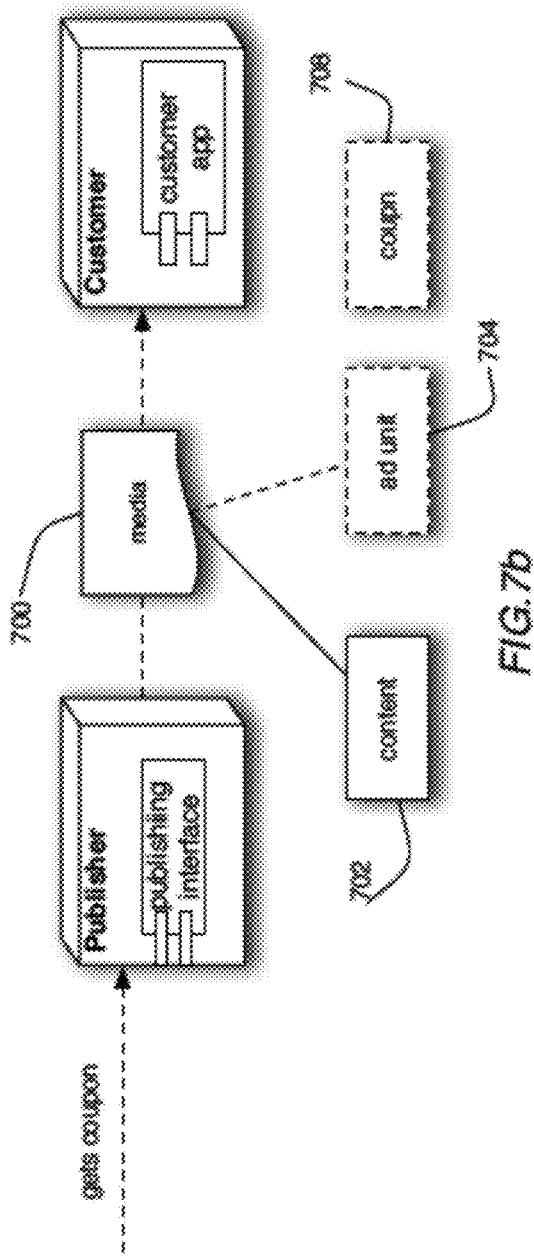

The use cases 300 also include a reply to query function 308 wherein the DCPMS 102 replies to the query Q1 by returning a coupon to the publisher 302 or a reply indicating that no coupon is available for the particular ad unit associated with the coupon request Q1. FIG. 7B shows the media 700 that is published on a customer node 108 as updated by the Publisher to include a coupon 708.

Figure 4:
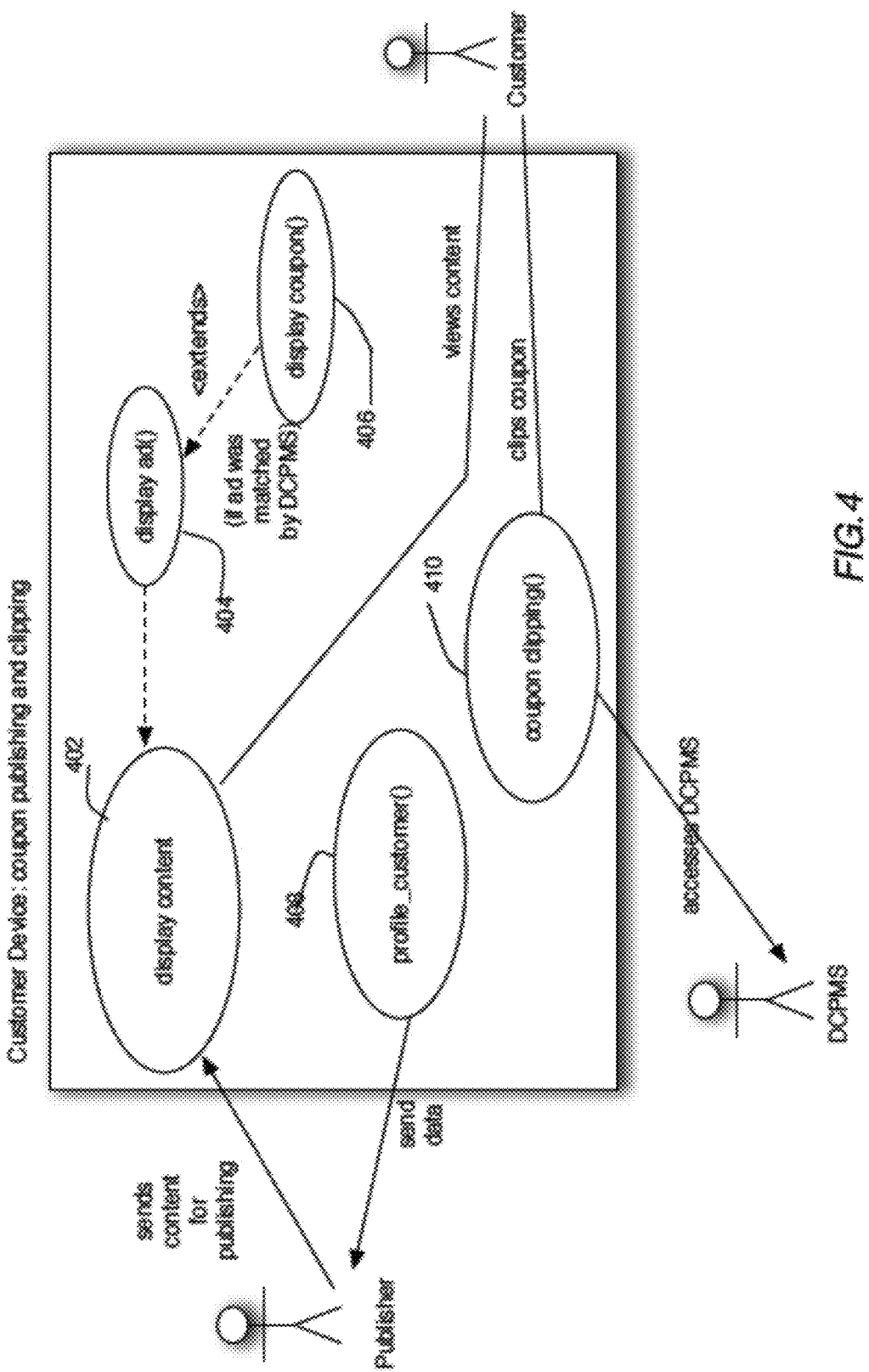
FIG. 4 shows the use cases for coupon clipping and publishing in accordance with one embodiment of the invention.

FIG. 4 shows use cases 400 for coupon displaying and clipping on the customer node 402, in accordance with one embodiment of the invention. As will be seen, the customer node 108 is configured to display content by executing a display content function 402. The display content function 402 may be extended to include a display ad function 404 which in turn may be extended to include a display coupon function 406 if the ad unit associated with the ad being displayed is match by the DCPMS 102, as described earlier. A profile customer ( ) function 408 collects profile information for a customer which is transmitted to the Publisher. The use cases 400 also includes a coupon clipping ( ) function 410. Under the coupon clipping function 410, a Customer performs a 'clipping action' in relation to a coupon. For example, in one embodiment, the clipping action may include selection of a clipping button associated with the coupon. Responsive to said clipping action, the coupon clipping function 410 generates a coupon clipping notification and transmits it to the DCPMS 102.

Figure 8:
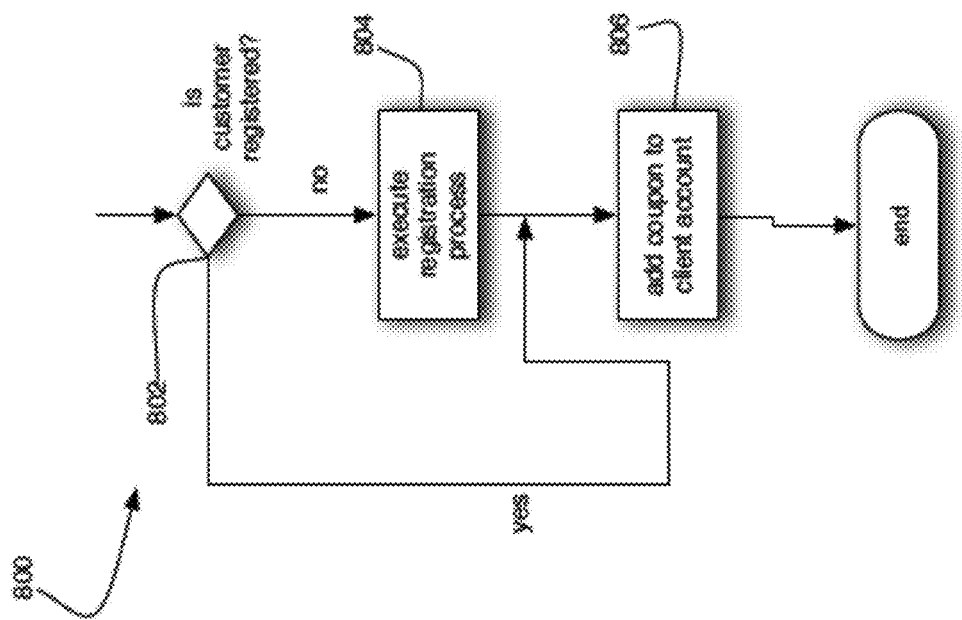
FIG. 8 shows a flowchart for processing a coupon clipping notification, in accordance with one embodiment of the invention.

Referring now to FIG. 8 of the drawings, there is shown a process 800 executed on the DCPMS 102 responsive to receiving a coupon clipping notification. At block 802, a check is made to determine if the customer is a registered customer. In one embodiment this step includes validating customer credentials included in the coupon clipping notification. If it is determined that the customer was not registered, then at block 804, a registration process is executed in order to register the customer. This process may include redirecting a customer to a registration page in order for the customer to input registration information. At block 806, the coupon identified by the coupon id in the coupon clipping notification is added to the customer's account. At this point, the DCPMS 102 may inform the Publisher that the coupon has been clipped, in which case the publisher may instruct a browser being used by the customer node 108 to view the coupon to stop displaying the coupon.

In the case where a Customer is using the coupon app 108B to view the published content, the coupon app 108B includes logic to stop showing the coupon as soon as the coupon clipping action is performed. Thus, a seamless coupon clipping experience is facilitated.

Figure 9B:
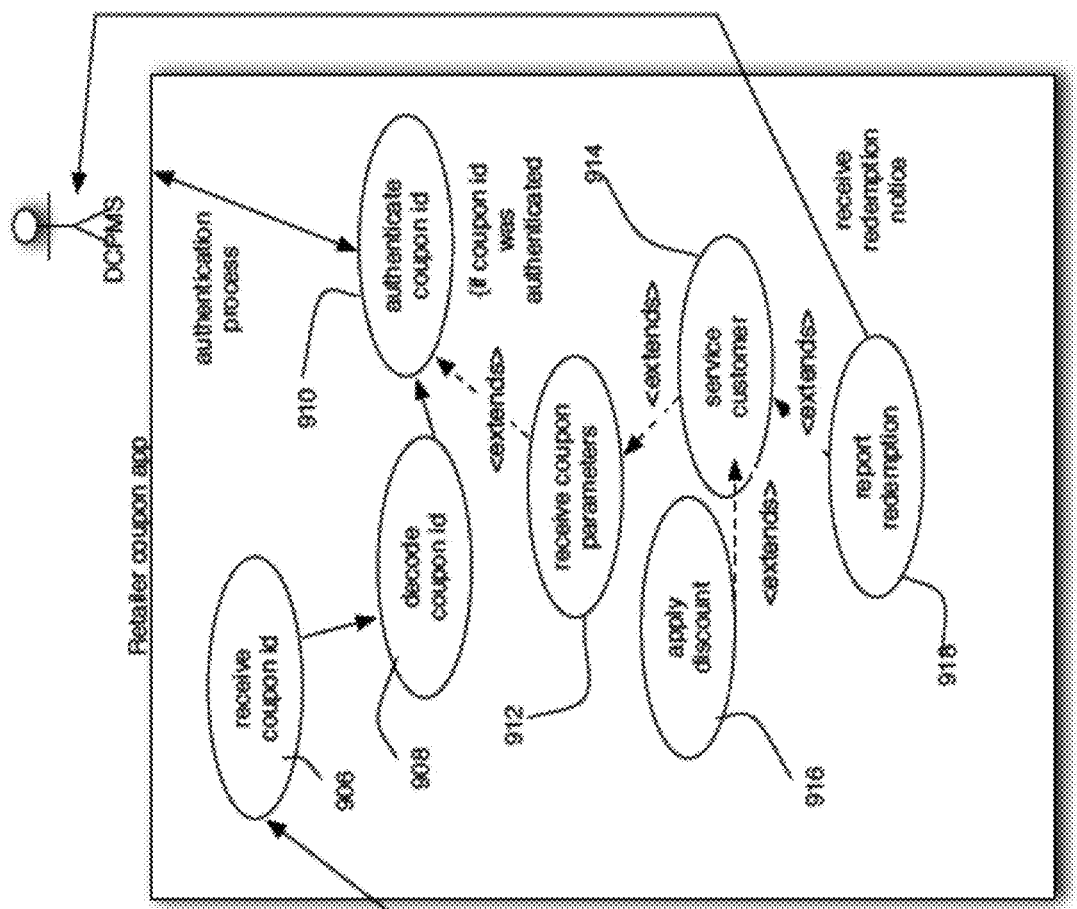
FIG. 9B shows the use cases for coupon redemption by the retailer coupon app, in accordance with one embodiment of the invention.
Figure 9A:
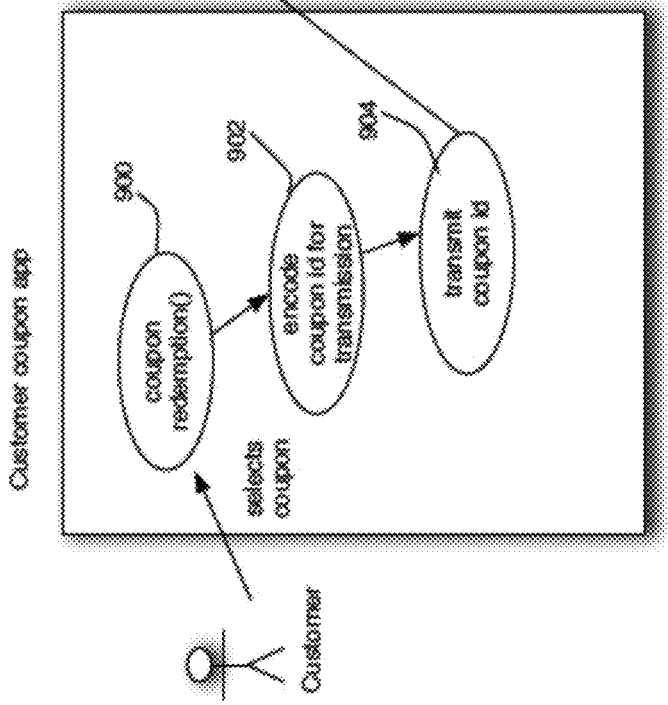
FIG. 9A shows the use cases for coupon redemption by the customer coupon app, in accordance with one embodiment of the invention.

Referring now to FIG. 9A of the drawings, there is shown a use case for coupon redemption by a Customer. As will be seen, a coupon redemption( ) function 900 includes a process 902 for encoding a coupon for transmission, and a process 904 for transmitting said encoded coupon to a retailer node. In one embodiment, the process 902 for encoding the coupon for transmission is based on the encoding scheme describe above and encodes the coupon as an audio signal which is then transmitted via a speaker associated with the customer node 108. The retailer node 110 then uses a microphone to detect the audio encoding. FIG. 9B also shows a use case for the retailer coupon app 110A to redeem a coupon, in accordance with one embodiment. Referring to FIG. 9B, process 906 comprises a receive coupon id ( ) function whereby a microphone of the retailer node 110 is used to listen for the coupon transmission from the customer node 108. A decode coupon id ( ) process 908 decodes the audio signal in order to extract the coupon id. An authenticate coupon id ( ) process 910 includes transmission of the coupon id to the DCPMS 102 by the retailer coupon app for authentication. The DCPMS 102 authenticates the coupon id and returns coupon parameters associated with the coupon id that was authenticated. The retailer coupon app then executes a receive coupon parameters ( ) function 912 to receive the coupon parameters from the DCPMS 102. A service customer ( ) function 914 includes servicing the customer by providing the goods and/or services associated with the coupon. A apply discount ( ) function 916 extends the service customer ( ) function 914 to apply the discount indicated in the coupon to the transaction with the customer. A report redemption ( ) function 918 includes operations to report any coupon redemption to the DCPMS 102.

Figure 6:
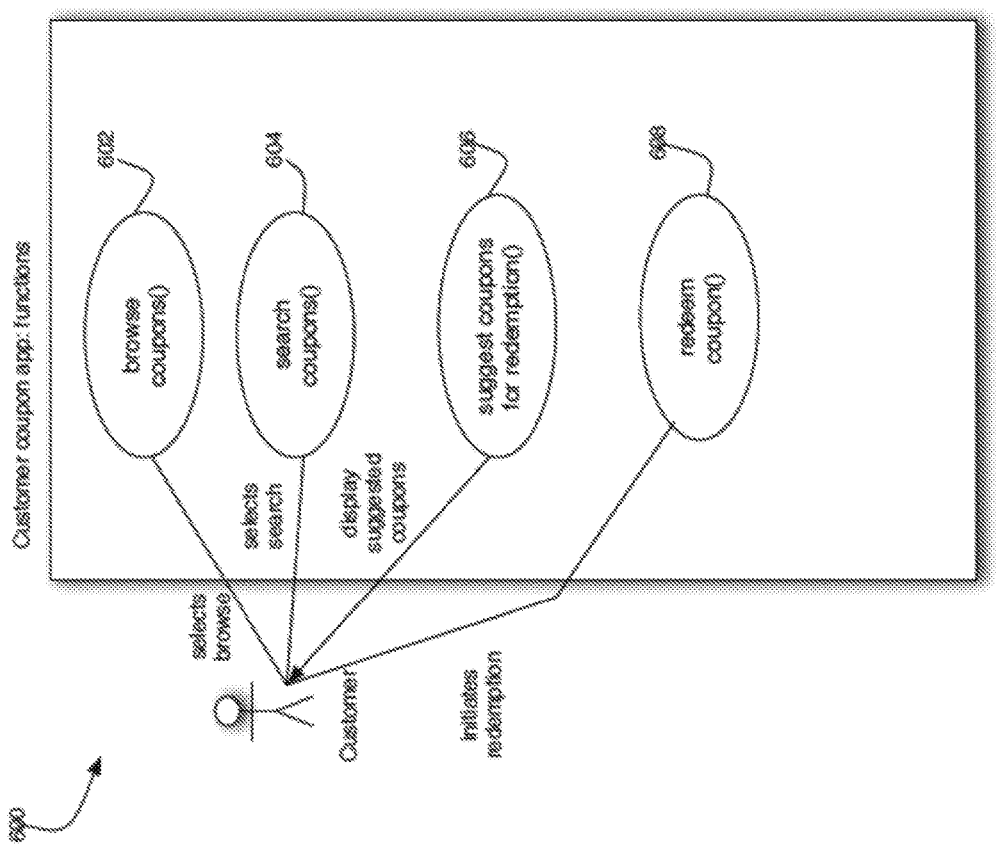
FIG. 6 shows the use cases for the customer coupon app, in accordance with one embodiment of the invention.

Referring now to FIG. 6 of the drawings, use cases 600 are associated with the coupon app 108B. As will be seen, the use cases 600 may include a browse coupons ( ) function 602. This function allows a Customer to browse previously clipped coupons. A search coupon ( ) function 604 allows the Customer to search for particular coupons based on search criteria. A suggest coupon for redemption ( ) function 608 implements functionality to proactively suggest coupons for redemption to a Customer. For example, in one embodiment based on the location, the Customer may be shown coupons that are only available for redemption at that particular location. Finally, the use case 600 includes a redeem coupon function ( ) 610, whereby the Customer may redeem a selected coupon, as has been described above.

Figure 10:
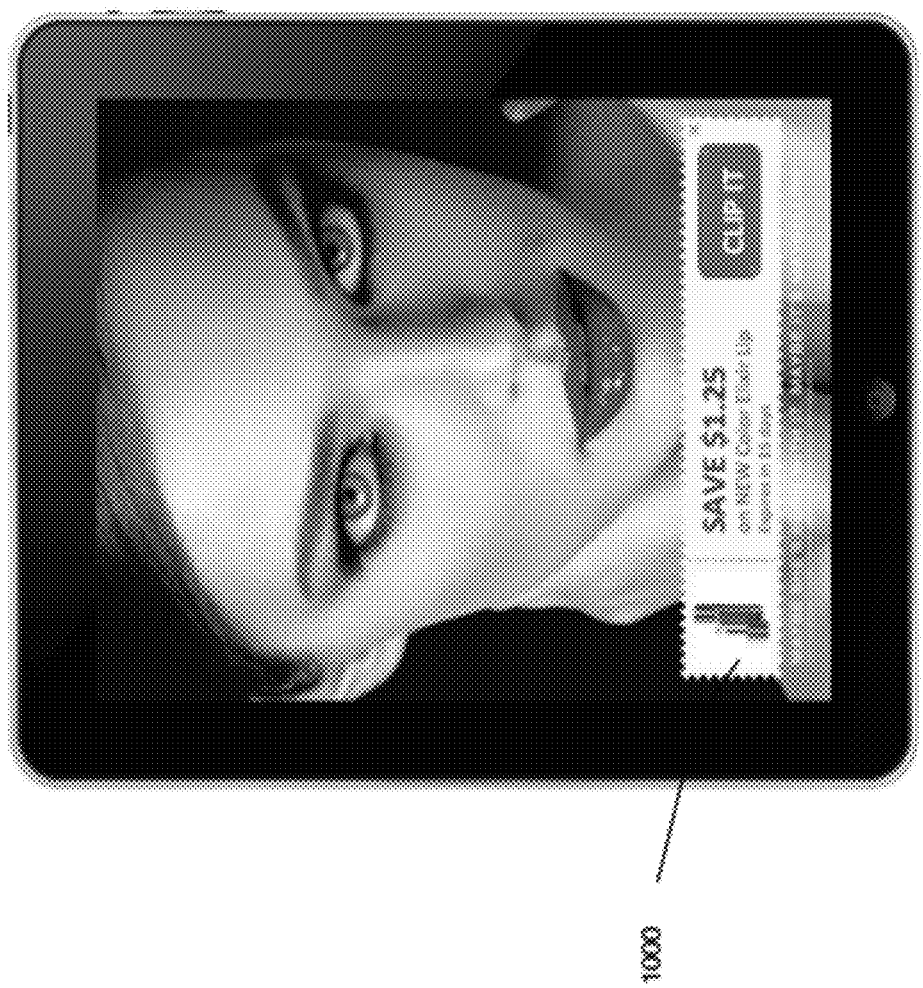
FIG. 10 shows an example of published coupon, in accordance with one embodiment of the invention.
Figure 11:
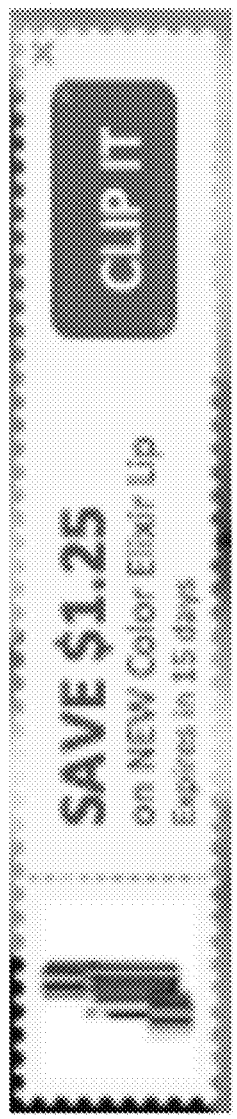
FIG. 11 shows the published coupon of FIG. 10 in magnified view, in accordance with one embodiment of the invention.
Figure 11:
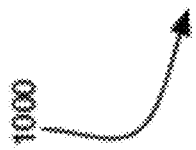

Referring now to FIG. 10 of the drawings, there is shown a coupon 1000 which is published in association with an advertisement for women's' lipstick. The coupon 1000 is shown in magnified view FIG. 11 of the drawings. As will be seen, the coupon 1000 includes a discount of $1.25, and a coupon expiration, which is set to 15 days. Further, the coupon 1000 includes a 'clip it button'. This button may be used to clip the coupon 1000 in accordance with the techniques disclosed herein.

Figure 12:
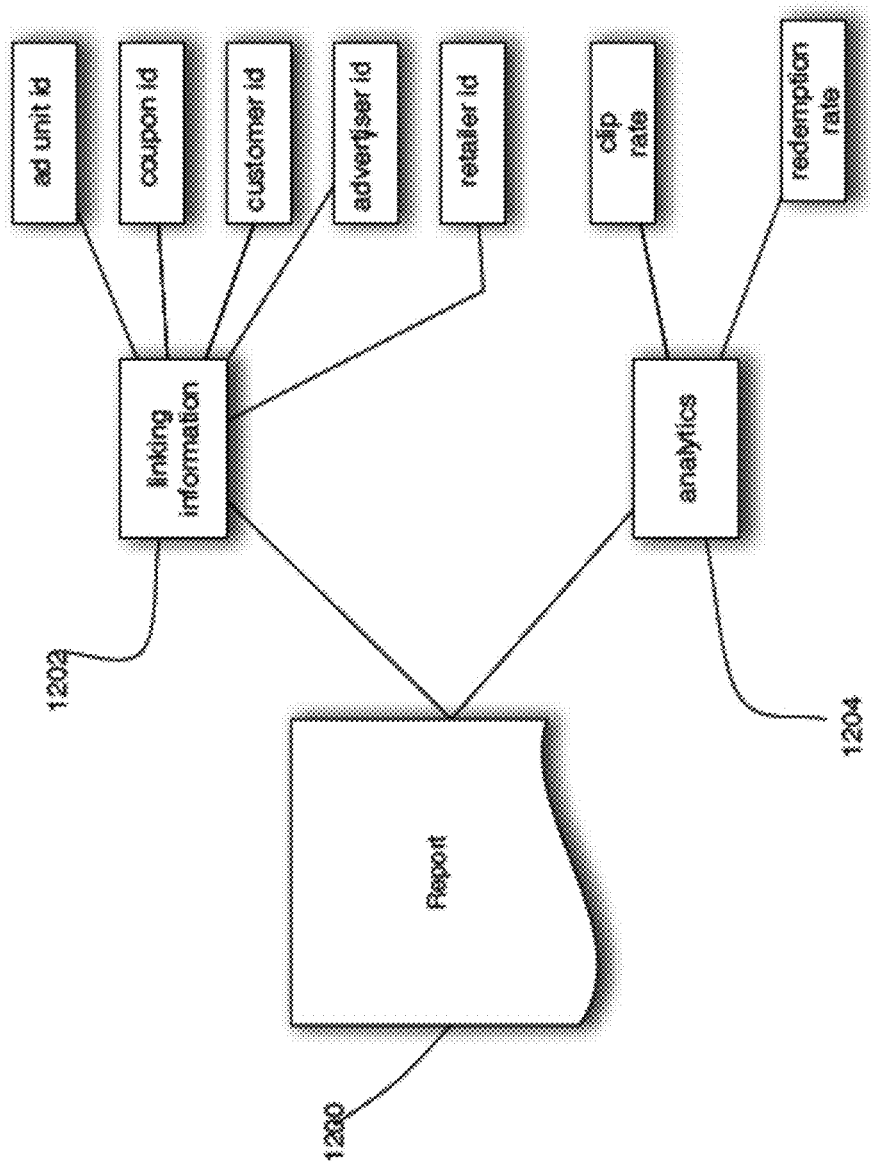
FIG. 12 shows an example of a report to an Advertiser, in accordance with one embodiment of the invention.

FIG. 12 shows a report 1200 that may be generated for an Advertiser, in accordance with one embodiment. The report 1200 includes linking information 1202 to link ad unit id, coupon id, customer id, advertiser id, and retailer id. Report 1200 also includes an analytics component 1204 which may provide detailed analysis on a coupon's clip rate and its redemption rate. The coupon clip rate and redemption rate may be used to optimize a coupon campaign. As has been mentioned, machine running techniques are used to generate a coupon in a dynamic fashion. For example, coupon may be configured to have a certain clip rate and a certain redemption. If a clip rate for a coupon is too high the system may dynamically reduce the discount associated with the coupon in order to throttle or scale back the redemption rate. Alternatively, if the coupon clip rate is too low, then the DCPM 102 S may dynamically increase the discount associated with the coupon in order to achieve the desired clip rate. Likewise, a coupons redemptions rate may be used to dynamically scale the offer sized associated with the coupon in order to achieve a desirable redemption rate.

Figure 13:
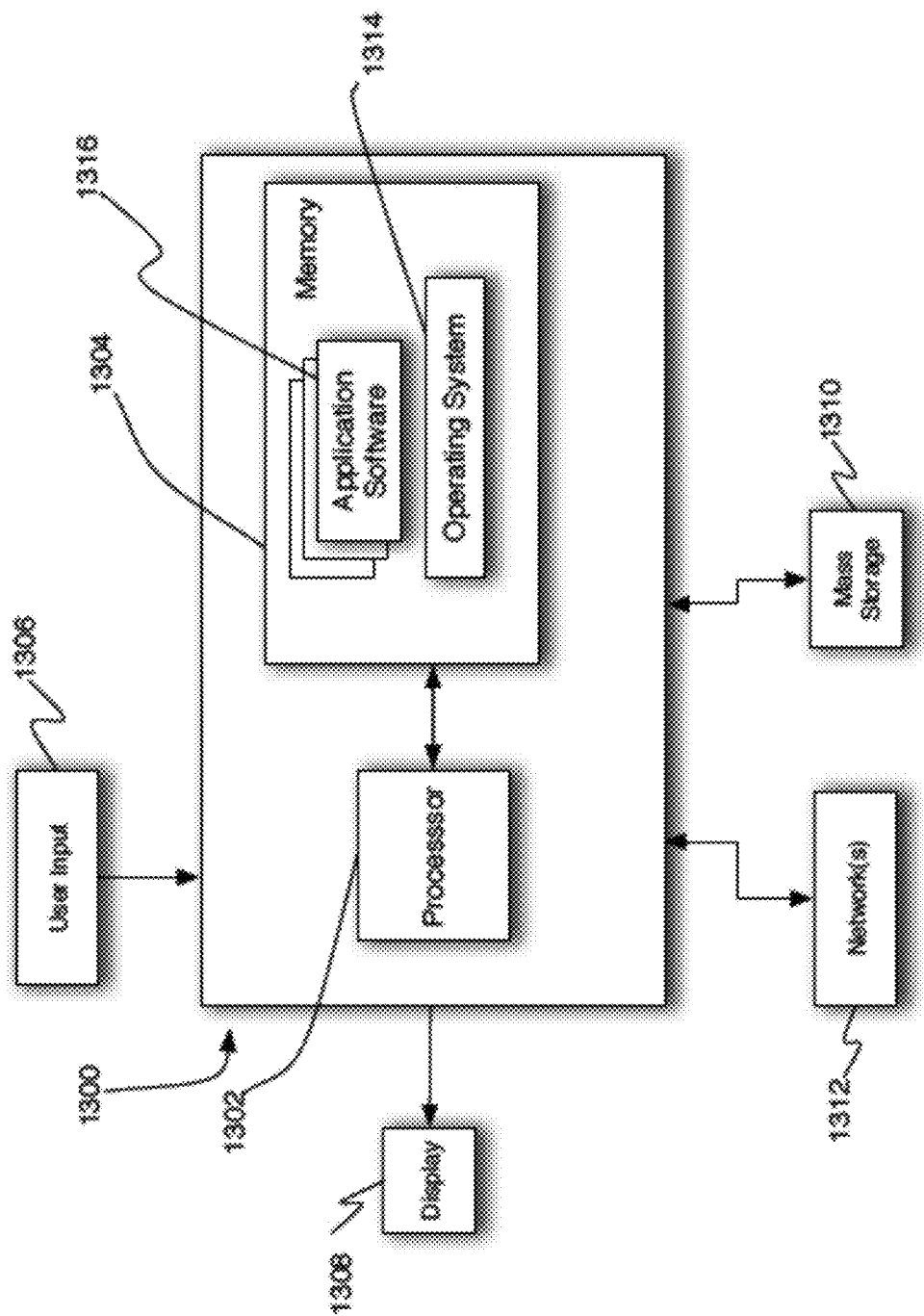
FIG. 13 shows a high-level block diagram of hardware for implementing the DCPMS, in accordance with one embodiment of the invention.

FIG. 13 shows an example of hardware 1300 that may be used to implement the DCPMS 102 in accordance with one embodiment. The hardware 1300 may include at least one processor 1302 coupled to a memory 1304. The processor 1302 may represent one or more processors (e.g., microprocessors), and the memory 1304 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1304 may be considered to include memory storage physically located elsewhere in the hardware, e.g. any cache memory in the processor 1302, as well as any storage capacity used as a virtual memory, e.g., as stored on a mass storage device.

The hardware also typically receives a number of inputs and outputs for communicating information externally. For interface with a user or operator, the hardware may include one or more user input output devices 1306 (e.g., a keyboard, mouse, etc.) and a display 1308. For additional storage, the hardware 1300 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1312 and each of the components, as is well known in the art.

The hardware 1300 operates under the control of an operating system 1314, and executes application software 1316 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The invention claimed is:

1. A method for redeeming a coupon using a mobile device, comprising:
  allowing a user to select the coupon;
  accessing at least one melody stored in a memory of the mobile device;
  passing a coupon identifier for the coupon and the at least one melody to an encoder component of the mobile device;
  sandwiching the coupon identifier between two portions of the melody to generate a bookend melody;

encoding the bookend melody by the encoder component to generate a signal for square wave transmission; and transmitting said signal through a speaker of said mobile device for reception through a microphone of a receiving mobile device.

2. The method of claim 1, wherein accessing at least one bookend melody comprises accessing two melodies designed, when encoded, to bookend the encoding corresponding to the coupon identifier so that said encoding corresponding to the coupon identifier is sandwiched between the encodings corresponding to the two melodies.

3. The method of claim 1, wherein the at least one bookend melody is selected to mask the encoding corresponding to the coupon identifier during transmission of the signal.

4. The method of claim 1, wherein said signal is a first signal.

5. The method of claim 4, further comprising generating a second signal and transmitting same together with the first signal; wherein the second signal has lower autocorrelation properties and is selected to trigger the second device to invoke an expensive filter, as measured in terms of one of power, processing; and memory usage, to search for the second signal.

6. The method of claim 1, wherein a waveform corresponding to the signal has a constant envelope.

7. The method of claim 1, wherein the signal comprises a quasi-periodic signal with a frequency that increases at a constant rate in time over a specified band.

8. A mobile device, comprising:

a memory to store at least one melody and a coupon identifier;

an encoder for encoding at least one bookend melody to generate a square wave signal for transmission, wherein the bookend melody is generated by sandwiching the coupon identifier between two portions of the melody; and a speaker to transmit said signal for reception through a microphone of a receiving mobile device.

9. The mobile device of claim 8, wherein the encoder is configured to encode two melodies designed, when encoded, to bookend the encoding corresponding to the coupon identifier so that said encoding corresponding to the coupon identifier is sandwiched between the encodings corresponding to the two melodies.

10. The mobile device of claim 8, wherein the at least one bookend melody is selected to mask the encoding corresponding to the coupon identifier during transmission of the signal.

11. The mobile device of claim 8, wherein said signal is a first signal.

12. The mobile device of claim 11, further configured to generate a second signal and to transmit same together with the first signal; wherein the second signal has lower autocorrelation properties and is selected to trigger the second device to invoke an expensive filter, as measured in terms of one of power, processing; and memory usage, to search for the second signal.

13. The mobile device of claim 8, wherein a waveform corresponding to the signal has a constant envelope.

14. The mobile device of claim 8, wherein the signal comprises a quasi-periodic signal with a frequency that increases at a constant rate in time over a specified band.

* * * * *